US012696855B2

(12) United States Patent
Waldner

(10) Patent No.: US 12,696,855 B2
(45) Date of Patent: Aug. 4, 2026

(54) APPARATUS AND METHOD FOR IRRIGATION USING TWO SEQUENTIAL NOZZLES AT DIFFERENT RATES FOR REDUCED WATER VOLUME

(71) Applicant: Cascade Manufacturing Ltd., MacGregor (CA)

(72) Inventor: Matthew Waldner, MacGregor (CA)

(73) Assignee: Cascade Manufacturing Ltd., MacGregor (CA)

( * ) Notice: Subject to any disclaimer, the term of this patent is extended or adjusted under 35 U.S.C. 154(b) by 569 days.

(21) Appl. No.: 18/084,227

(22) Filed: Dec. 19, 2022

(65) Prior Publication Data

US 2024/0196818 A1    Jun. 20, 2024

(51) Int. Cl.
| *A01G 25/09* | (2006.01) |
| *B05B 12/08* | (2006.01) |
| *B05B 13/00* | (2006.01) |

(52) U.S. Cl.
CPC .......... *A01G 25/092* (2013.01); *B05B 12/084* (2013.01); *B05B 13/005* (2013.01)

(58) Field of Classification Search
CPC .... A01G 25/092; B05B 12/084; B05B 13/005
USPC ......................................................... 239/11
See application file for complete search history.

(56) References Cited

U.S. PATENT DOCUMENTS

| | | | | | |
|---|---|---|---|---|---|
| 3,448,927 | A | * | 6/1969 | Blair | A01G 25/092 |
| | | | | | 239/728 |
| 4,964,575 | A | * | 10/1990 | Takata | A01M 9/003 |
| | | | | | 239/689 |

| | | | | | |
|---|---|---|---|---|---|
| 5,028,009 | A | * | 7/1991 | Takata | A01C 7/087 |
| | | | | | 239/689 |
| 5,220,876 | A | * | 6/1993 | Monson | A01C 21/005 |
| | | | | | 706/904 |
| 5,246,164 | A | * | 9/1993 | McCann | A01G 25/16 |
| | | | | | 239/11 |
| 5,355,815 | A | * | 10/1994 | Monson | A01C 21/007 |
| | | | | | 111/200 |
| 5,574,657 | A | * | 11/1996 | Tofte | A01M 7/0092 |
| | | | | | 700/240 |
| 5,884,224 | A | * | 3/1999 | McNabb | A01G 7/00 |
| | | | | | 700/284 |
| 6,230,091 | B1 | * | 5/2001 | McQuinn | A01B 79/005 |
| | | | | | 700/282 |

* cited by examiner

*Primary Examiner* — Chee-Chong Lee

(74) *Attorney, Agent, or Firm* — Adrian D. Battison; Ryan W. Dupuis; Ade & Company Inc.

(57) ABSTRACT

An apparatus for irrigation includes an elongate pipe carried on support carriages at longitudinally spaced positions to move in transverse to its length. The pipe carries water dispensing arrangements spaced along the pipe each including a first nozzle and a second nozzle carried on arms projecting forwardly and rearwardly of the pipe so that the nozzles dispense together an amount of water required at the location of the ground aligned with nozzles. The first and second nozzles are arranged such that the first dispenses at a higher rate and both dispense water onto the portion of the ground sequentially at a rate which is less than an amount which exceeds the infiltration rate of the soil, so that a total rate can exceed the infiltration rate of the soil. The arms can be flipped in height between high crop position and low crop position.

13 Claims, 4 Drawing Sheets

APPARATUS AND METHOD FOR IRRIGATION USING TWO SEQUENTIAL NOZZLES AT DIFFERENT RATES FOR REDUCED WATER VOLUME

This invention relates to an apparatus and method for irrigation of the type using nozzles at spaced positions along an irrigation pipe moving transversely to its length over an area to be irrigated using reduced total water volume.

BACKGROUND OF THE INVENTION

One known mechanised system is the so-called centre-pivot system. This system comprises a long, sprinkler carrying irrigation pipe, supported above the ground and substantially parallel thereto, by a series of spaced, wheeled towers or supports. The system is anchored at one end for example by a concrete block so that the system in use may rotate about the anchor point. It will be appreciated that during rotation, towers towards the free end of the pipe travel faster than those towards the anchored end. In particular a tower twice as far from the anchor point as a tower closer thereto will travel twice as fast about the anchor point.

Assuming that, in use, a certain amount of water must be applied in the region of the closer of the above two towers then it follows that double that amount, should be applied at the outer tower to ensure that substantially the same volume of water is applied per unit area over the whole area to be irrigated.

It is known that different soil types have different infiltration capacities. Thus should the application rate exceed the infiltration capacity of the soil, it will result in a run-off of water with a consequent wastage of water and of course also possible erosion of the land.

It is accordingly an object of the present invention to provide an alternative mechanised irrigation system and a method of irrigation with which it is believed the aforementioned problems will at least be alleviated.

SUMMARY OF THE INVENTION

According to the invention there is provided an apparatus for irrigation comprising:

a pipe for carrying irrigation water and arranged to extend along an area to be irrigated;

a plurality of support carriages at spaced positions along the pipe arranged to carry the pipe in a direction of travel transverse to its length;

a plurality of water spray dispensing arrangements at spaced positions along the pipe so that each dispensing arrangement acts to deposit a water spray on the ground in a spray pattern at respective positions along the pipe with the dispensing arrangements spaced relative to the spray pattern so that the dispensing arrangements combine to substantially cover the area as the pipe is carried across the area in said direction of travel;

each dispensing arrangement comprising a first nozzle and a second nozzle where the first and second nozzles are arranged one in advance of the other as the pipe moves in the direction of travel;

the first and second nozzles being arranged to dispense together an amount of water required at a portion of the ground aligned with the position on the pipe;

the first and second nozzles being arranged such that the first nozzle dispenses a greater volume of water than the second.

The first and second nozzles are arranged at aligned positions along the pipe and are arranged to dispense the water in said spray pattern where the spray patterns of the first and second nozzles have a substantially common length along the pipe so that each dispenses on the same portion of the ground in sequential manner. In this way the spray patterns of the two nozzles directly overlap and are applied sequentially across the locations on the ground.

Preferably the first and second nozzles are arranged forwardly and rearwardly of the pipe in respect to the travel direction. However other support arrangements can be used. The nozzles thus can be spaced by a distance greater than the order of 20 feet and typically of the order of 35 feet so that there is a significant period of time between the sequential spray actions giving some time for the water from the first to infiltrate before the second reaches the same location.

In one important feature, the first and second nozzles are adjustable in height relative to the pipe so as to change the operation height of the nozzles so as to provide two adjustment positions of the height of the nozzles including a high position for use with tall crops and a low position for use with short crops. The use of a low position when operating on short crops such as vegetables reduces water loss which can occur from evaporation when the water is sprayed from a height well above the crops.

In one preferred arrangement this can be obtained where the first and second nozzles are arranged each on a respective support arm extending forwardly and rearwardly respectively of the pipe in respect to the travel direction. In this way the pipe, which is a main elongate component and thus relatively heavy, can be maintained at a fixed height on the support carriages while the support arms are pivotal around a longitudinal axis of the pipe.

In order to reduce the mass of the support arms, these can be supported by wires which extend outwardly from a position at the pipe and provide support in the adjustment positions of the height of the nozzles.

Preferably the high position is located substantially at the same height as the pipe so that the nozzles and the pipe both clear the height of a high crop such as corn.

The support arms carried on the wires are held at the required different heights by linkages which can be manually actuated to flip between the two adjustment positions.

Preferably the support arms act as conduits from the pipe to the nozzles to further reduce the mass and complexity with the nozzles are located on flexible hose positions depending from outer ends of the support arms.

In order to avoid excess water which exceeds the infiltration rate of the soil over time, preferably the first and second nozzles are arranged such that the second nozzle dispenses onto the ground an amount of water which is less than that of the first nozzle by a ratio of at least 60/40.

Preferably the ration of the first nozzle to the second nozzle lies in the range 60/40 up to 80/20 and preferably around 70/30.

That is preferably, the first and second nozzles are arranged such that each dispenses water onto the portion of the ground at a respective first and second rate at its time of dispensing which is less than an amount which exceeds the infiltration rate of the soil at that time.

That is preferably, the first and second nozzles are arranged such that each dispenses water onto the portion of the ground at a respective first and second rate which is less than an amount which exceeds the infiltration rate of the soil and wherein a total rate defined by a sum of the first and second rate exceeds the infiltration rate of the soil.

According to a second independent aspect of the invention there is provided an apparatus for irrigation comprising:

a pipe for carrying irrigation water and arranged to extend along an area to be irrigated;

a plurality of support carriages at spaced positions along the pipe arranged to carry the pipe in a direction of travel transverse to its length;

a plurality of water spray dispensing arrangements at spaced positions along the pipe so that each dispensing arrangement acts to deposit a water spray on the ground in a spray pattern at respective positions along the pipe with the dispensing arrangements spaced relative to the spray pattern so that the dispensing arrangements combine to substantially cover the area as the pipe is carried across the area in said direction of travel;

each dispensing arrangement comprising a first nozzle and a second nozzle where the first and second nozzles are arranged one in advance of the other as the pipe moves in the direction of travel;

the first and second nozzles being arranged to dispense together an amount of water required at a portion of the ground aligned with the position on the pipe;

wherein the first and second nozzles are arranged each on a respective support arm extending forwardly and rearwardly respectively of the pipe in respect to the travel direction;

and wherein support arms carrying the first and second nozzles are adjustable in height relative to the pipe.

Any of the above defined optional features can also be used with this arrangement.

According to a further independent aspect of the invention there is provided a method for irrigation of ground comprising:

mounting a pipe for carrying irrigation water and arranged to extend along an area to be irrigated on a plurality of support carriages at spaced positions along the pipe arranged to carry the pipe in a direction of travel transverse to its length;

providing a plurality of water spray dispensing arrangements at spaced positions along the pipe so that each dispensing arrangement acts to deposit a water spray on the ground in a spray pattern at respective positions along the pipe with the dispensing arrangements spaced relative to the spray pattern so that the dispensing arrangements combine to substantially cover the area as the pipe is carried across the area in said direction of travel;

each dispensing arrangement comprising a first nozzle and a second nozzle where the first and second nozzles are arranged one in advance of the other as the pipe moves in the direction of travel;

the first and second nozzles being arranged to dispense together an amount of water required at a portion of the ground aligned with the position on the pipe;

determining an infiltration rate of the ground over time;

causing the first and second nozzles to dispense water onto a portion of the ground at a respective first and second rate at its time of dispensing which is less than an amount which exceeds the infiltration rate of the soil at that time.

A set forth above, preferably the first and second nozzles are arranged such that each dispenses water onto the portion of the ground at a respective first and second rate which is less than an amount which exceeds the infiltration rate of the soil and wherein a total rate defined by a sum of the first and second rate exceeds the infiltration rate of the soil. In this way surprisingly the water uptake in the soil can be increased while avoiding any water losses due to puddling by exceeding the infiltration rate of the soil, thus significantly reducing total water usage and maximizing efficiency.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
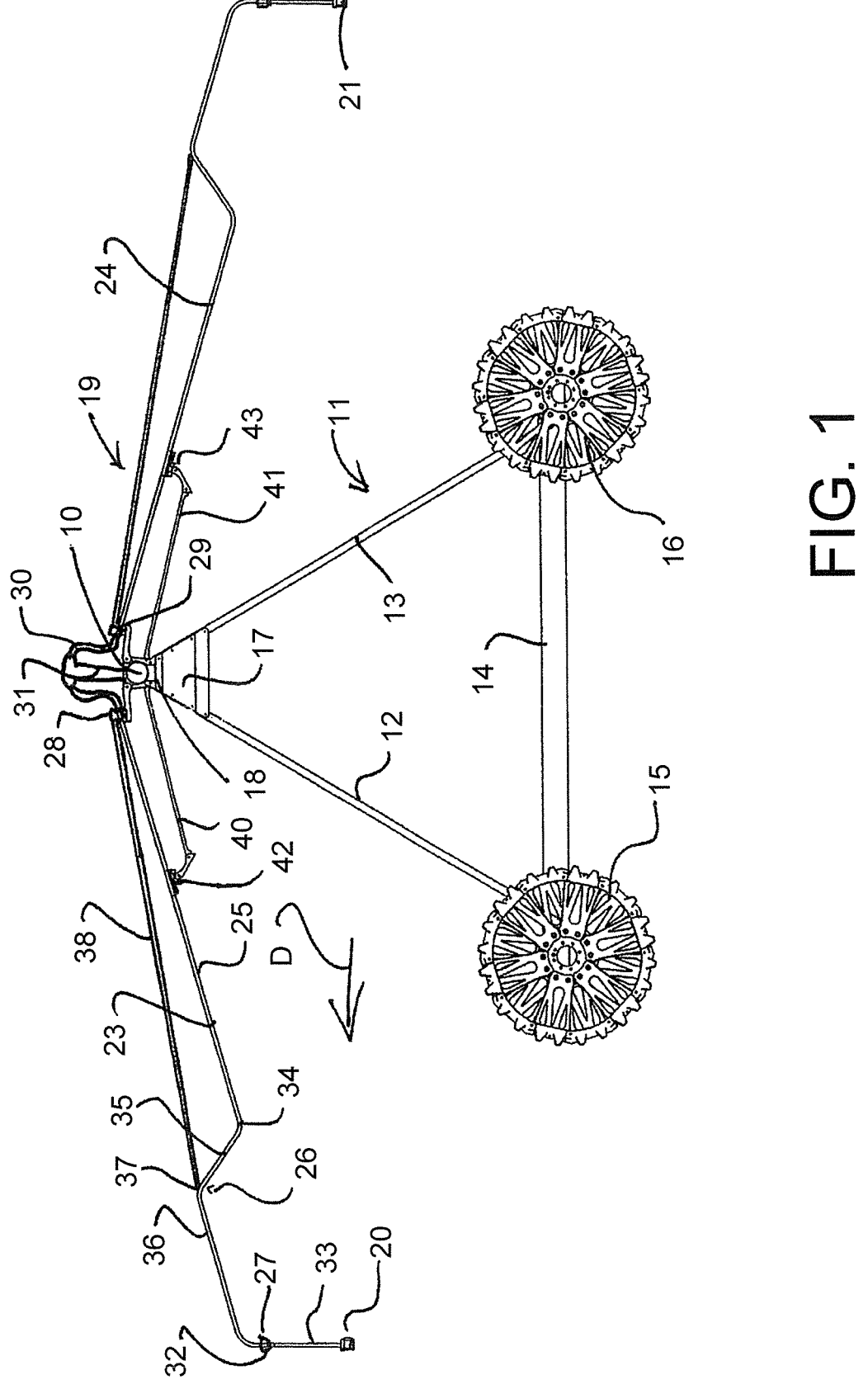
FIG. 1 is an end elevational view of an irrigation apparatus according to the present invention showing the booms and nozzles in a raised position for tall crops.

The figure shown an apparatus for irrigation which includes an elongate rigid support pipe for carrying irrigation water. The pipe is mounted on a plurality of generally triangular support carriages 11 at spaced positions along the pipe. In the figures is shown for convenience only one of the carriages 11 which includes inclined struts 12 and 13 depending to a transverse axle 14 carrying two wheels 15 and 16 for movement of the carriages 11 in a direction in the plane of the carriage and thus at right angles to the length of the pipe. The struts converge to a bracket 17 at the top which includes a clamp 18 for connection to the pipe. The carriages together thus act to carry the pipe in a direction of travel transverse to its length with the pipe arranged to extend along an area to be irrigated. Typically the inner end of the pipe is anchored at an arrangement not shown so that the carriages rotate around the anchored end.

The pipe carries a plurality of water spray dispensing arrangements 19 at spaced positions along the pipe. Only one of the arrangements 19 is shown again for convenience of illustration but it will be appreciated that all are of the same construction. Each dispensing arrangement acts to deposit a water spray on the ground in a spray pattern shown in in FIG. 4.

The spray arrangements are located at respective positions along the pipe and are spaced relative to the spray pattern so that the spray arrangements reach along the pipe to a point of intersection so as to combine and to substantially cover the area along the full length of the pipe as the pipe is carried across the area in the direction of travel indicated at D.

Each spray arrangement 19 incudes a first nozzle 20 and a second nozzle 21 where the first nozzle 20 and second nozzle 21 are arranged one in advance of the other as the pipe moves in the direction D of travel.

The first and second nozzles are arranged to dispense together an amount of water required to properly irrigate the ground at a portion of the ground aligned with the position on the pipe and thus receiving the water from the two nozzles of that spray arrangement. The first and second nozzles are arranged such that the first nozzle 20 dispenses a greater volume of water than the second nozzle 21. This is shown graphically in FIG. 4.

The sprinkler system defined by the first and second nozzles and the spacing therebetween in the direction of travel acts to reduce watering intensity while allowing maximum water application. This is done without exceeding the soil infiltration rate at the location and time at which the water is being applied.

Figure 4:
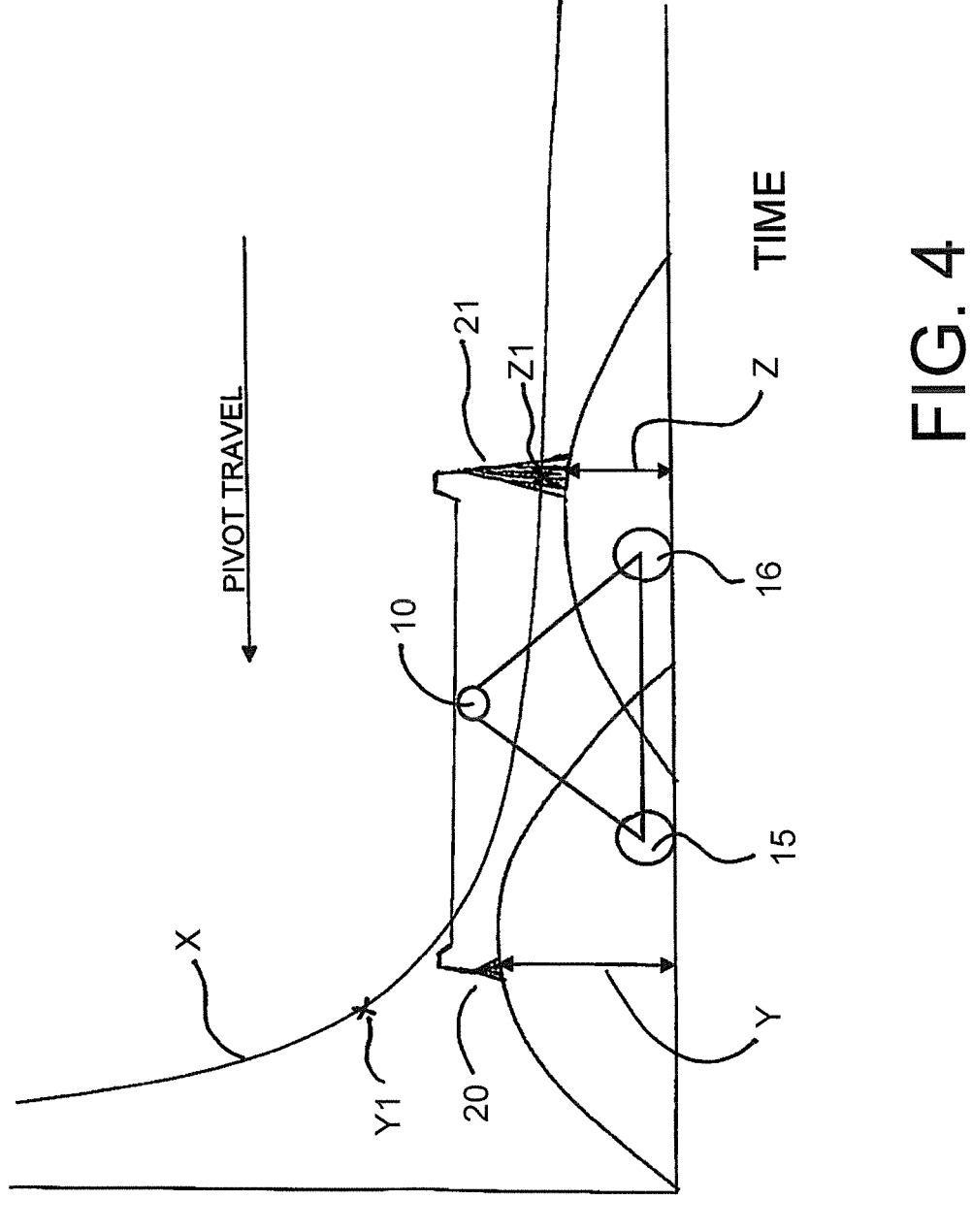
FIG. 4 is schematic graph showing the operation of the front and rear nozzles of the irrigation apparatus of FIG. 1 relative to an infiltration rate of the soil.

That is FIG. 4 shows how the nozzle arrangement and spacing matches the infiltration curve X showing the amount of water which can be absorbed at any time as water is applied and as the nozzles move over a location to be watered. It will be noted that the water applied at the first nozzle 20 indicated at Y is below the maximum amount of water at Y1 which can be absorbed by the soil. Similarly the amount of water dispensed by the nozzle 21 as indicated at Z is less than the point Z1 on the graph. Thus at both locations the water dispensed is less that that which can be absorbed so to avoid any puddling. At the same time the sum of the two amounts Y and Z is greater that the amount which can be absorbed by the soil if applied at the same location.

Thus the first and second nozzles are arranged at aligned positions along the pipe and are arranged to dispense the water in said spray pattern where the spray patterns of the first and second nozzles have a substantially common length along the pipe so that each dispenses on the same portion of the ground in sequential manner. In this way the spray patterns of the two nozzles directly overlap and are applied sequentially across the locations on the ground.

The nozzle 20 in advance of the pipe thus applies a higher level of water and the second nozzle 21 applies less.

That is the first and second nozzles are arranged such that the respective first and second rates are each less than an amount which exceeds the infiltration rate or absorption rate of the soil and the total rate applied which is the sum of the two rates exceeds the infiltration rate of the soil if applied simultaneously at the same location. The sum of the two rates is matched to the amount required as determined by an analysis of soil and moisture conditions.

The nozzles are of a type which is commercially available with the amount of water dispensed thereby being adjustable. Thus the user can adjust each nozzle depending on whether it is leading or trailing and depending on where it is along the length of the pipe, bearing gin mind that those closer to the outer end move faster than those adjacent the fixed end.

As the speed across the ground of the supports is designed to be constant, the water flow rate of the nozzles once set for the location of the nozzle can also remain constant. The setting is calculated so that the whole area over which water is applied receives the same amount. If the speed is changed or the required rate is changed then typically it is necessary to replace all of the nozzle to match the requirement.

In some cases the direction of movement of the pipe around the center anchor can be clockwise or can be counter clockwise. If the direction is switched, it is necessary to switch the first and second nozzles so that the larger volume is applied by the nozzle which passes first over the area.

The spacing of the first nozzle in front of the pipe by a distance of the order of 15 to 20 feet and typically around 17 feet and the rear nozzle behind the pipe by the same distance increases the area that is being wetted at any instant and hence reduces the intensity of the application. That is a typical nozzle may have a diameter of the circular spray pattern of the order of 40 to 50 feet so that the spacing of the two nozzles by more than 30 feet and up to 40 feet shapes the spray pattern into an oval of the order of 75 to 85 feet by 40 to 50 feet which is a significant increase and thus reduces the spray intensity at any specific location.

Construction of booms or arms of greater than 20 feet from the pipe may cause structural instability without use of additional metal supports which is undesirable as it significantly increases weight throughout the system.

The ratio of the water flow to the front and rear nozzles can be as low as 60/40 or as much as 80/20 with the preferred values being around 70/30. These ratios can be used to calculate the percentages of the separate nozzles by simple math.

It has been found that the change in the ratio of the water to the nozzles from an expected value of 50/50 to increase the proportion fed to the first nozzle together with the increase in area to which the water is applied by the spacing between the nozzles provides a dramatic reduction in water usage from a value of the order of 3 inches per hour of water applied to the ground down to ⅓ of that value which can be as low as 1 inch per hour.

Also the ability of the system to move the nozzles to high and low positions depending on the crop height significantly reduces loss by vaporization which adds to the advantages of reduced water usage set forth above.

It will be appreciated that the liquid supplied through the pipe is primarily water for irrigation, but as is well known may include as a constituent in the water other nutrients and chemicals required for the growth and management of the crops.

Yet further, the reduction in vaporization losses also reduces the amount of nutrients and chemicals lost to the air which can provide a significant further saving and also may reduce damaging effects of release of the materials to the air such as nitrogen which can gas off as damaging NO2.

As shown in the graph of FIG. 4, the nozzle configuration and this the flow rate matches the infiltration curve. It will be noted that any water applied at a rate higher than the infiltration rate is lost by puddling and is thus ineffective.

Preferably the first and second nozzles are arranged forwardly and rearwardly of the pipe in respect to the travel direction. However other support arrangements can be used. The nozzles thus can be spaced by a distance greater than the order of 20 feet and typically of the order of 35 feet so that there is a significant period of time between the sequential spray actions giving some time for the water from the first to infiltrate before the second reaches the same location.

Figure 2:
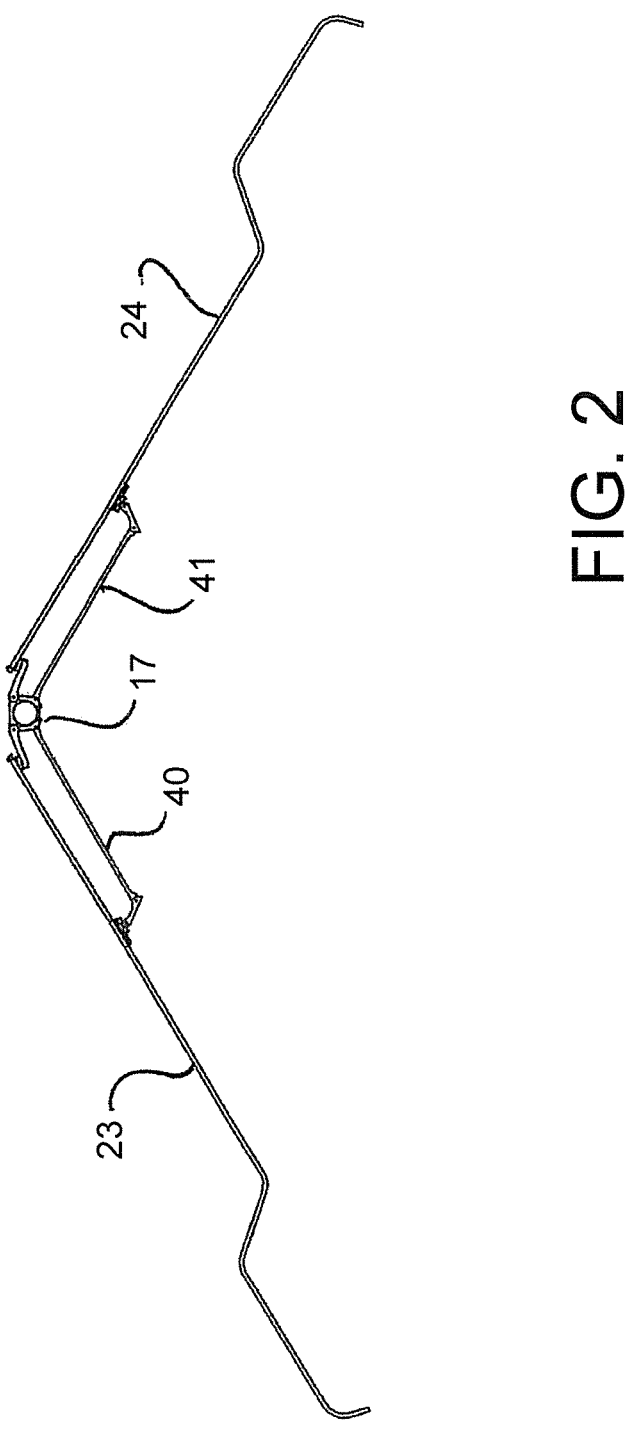
FIG. 2 is a similar end elevational view of the irrigation apparatus of FIG. 1 showing the booms in a lowered position for short crops.
Figure 3:
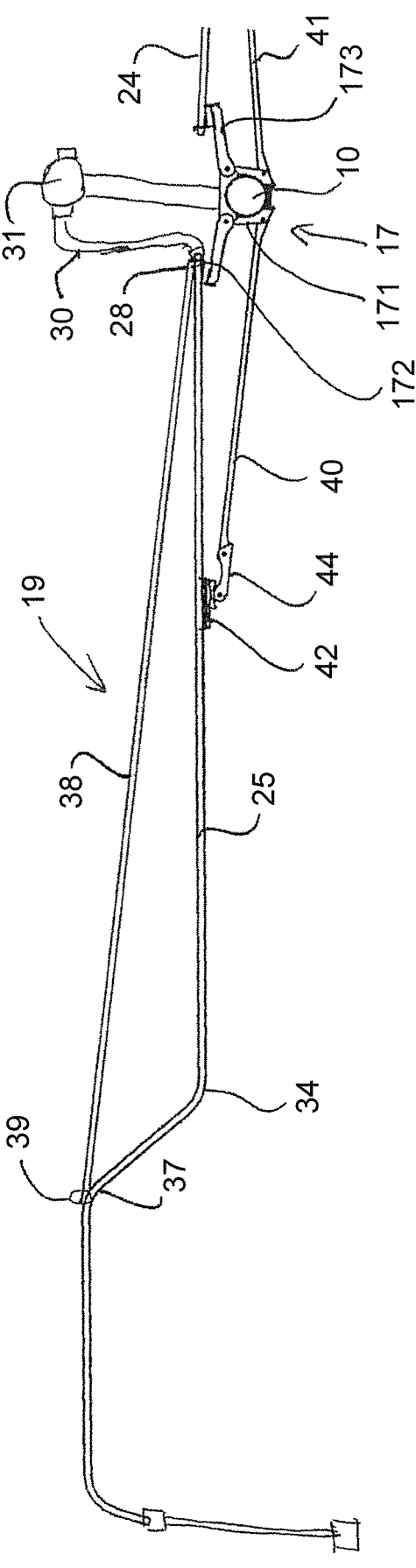
FIG. 3 is an end elevational view of the irrigation apparatus of FIG. 1 showing one half of the booms and nozzles on an enlarged scale.

As shown by comparing FIGS. 2 and 3, the first and second nozzles are adjustable in height relative to the pipe so as to change the operation height of the nozzles so as to provide two adjustment positions of the height of the nozzles including a high position shown in FIG. 3 for use with tall crops and a low position shown in FIG. 2 for use with short crops.

The first and second nozzles 20, 21 are arranged each on a respective support arm 23, 24 where the arm 23 extends forwardly and the arm 24 extends rearwardly of the pipe in respect to the travel direction. Each of the arms extends from an inner end 28 adjacent the pipe mounted on the bracket 18 to an outer end 21. The inner end includes a coupling 29 attached to a hose length 30 connected to an upstanding coupling from the pipe 10. Thus the hose length communicates water from the pipe into a hollow interior of the tubular body forming the arm 23. A further coupling 32 at the end 27 is connected to a hanging hose portion 33 of the nozzle 20 or 21. Thus the arm forms a component of the water flow conduit from the pipe 10 to the nozzles 20 and 21.

The arms include a first inner portion 25 extending from the inner end 28 to a bend 34 at which the arm extends upwardly and outwardly in a portion 35 to a further bend 37 defining an outer portion 36 extending outwardly to the outer end 27. A cable 38 extends from a connector at the coupling 28 to a connector at the bend 37 so as to carry the weight of the arm and transfer the weight from the outer end at the bend 37 to the bracket 17.

As best shown in FIG. 3, the bracket 17 includes a clamp portion 171 which engages onto the pipe 10. The clamp portion 171 includes two upper arms 172 and 173 which extend outwardly to support the inner ends 28 of the two arms 23 and 24. The mounting of the inner ends of the arms 23 and 24 on the two upper arms 172 and 173 allows limited pivotal movement of the arms 23 and 24 upwardly and downwardly between the raised and lowered position. The geometry of the shape of the arms and the length of the cables means that the arms are supported by the cables in both positions. The two positions are selected by two linkages 40 and 41 connected at the inner end to the clamp 171 and extending outwardly to a coupling 43 on the respective arm 23, 24. The linkage includes an over-center link 44 which causes a change in length of the linkage to take up one of the two selected positions.

In this way the pipe is maintained at a fixed height on the support carriages while the support arms 23 and 24 are pivotal around a longitudinal axis of the pipe at the clamp 17.

In order to reduce the mass of the support arms, these are supported by the cables 38 which extend outwardly from a position at the pipe and provide support in both the adjustment positions of the height of the nozzles.

As shown in FIG. 3 the high position is located substantially at the same height as the pipe so that the nozzles and the pipe both clear the height of a high crop such as corn.

The arrangement is used in a method where in a first step an infiltration rate of the ground over time is determined by testing or by prior knowledge of the local soil conditions. The first and second nozzles are then arranged and selected to dispense water onto a portion of the ground at a respective first and second rate at its time of dispensing which is less than an amount which exceeds the infiltration rate of the soil at that time. Further the first and second nozzles are arranged such that each dispenses water onto the portion of the ground at a respective first and second rate which is less than an amount which exceeds the infiltration rate of the soil where a total rate defined by a sum of the first and second rate exceeds the infiltration rate of the soil.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for irrigation comprising:
  a pipe for carrying irrigation water and arranged to extend along an area to be irrigated;
  a plurality of support carriages at spaced positions along a length of the pipe arranged to carry the pipe forwardly in a direction of travel transverse to its length;
  a plurality of water spray dispensing arrangements spaced along the length of the pipe so that each dispensing arrangement acts to deposit a water spray of the irrigation water on the ground in a spray pattern at a respective one of a plurality of spray positions along the length of the pipe;
  each dispensing arrangement comprising;

a first nozzle and a second nozzle where the first and second nozzles are arranged one in advance of the other as the pipe moves in the direction of travel;
  a first support arm attached to the pipe at one end of the first support arm and extending forwardly from the pipe so as to carry the first nozzle at an opposed end of the first support arm;
  the first nozzle thus being carried by the first support arm in advance of the pipe;
  a second support arm attached to the pipe at one end of the second support arm and extending rearwardly from the pipe so as to carry the second nozzle at an opposed end of the second support arm;
  the second nozzle thus being carried by the second support arm rearwardly of the pipe;
  so that the first nozzle dispenses the irrigation water onto the ground in advance of the pipe and in advance of the second nozzle as the pipe moves forwardly in the direction of travel;
  each of the first and second nozzles of each of the dispensing arrangements being adjustable to vary a rate of the irrigation water dispensed thereby;
  the first and second nozzles having the rate of irrigation water dispensed thereby adjusted so as to dispense together a required total amount of the irrigation water at a portion of the ground aligned with the respective spray position along the pipe;
  the first and second nozzles having the rate of irrigation water dispensed thereby adjusted such that the first nozzle dispenses a greater rate of the required total amount of the irrigation water and such that the second nozzle dispenses a lesser rate of the required total amount of the irrigation water and such that the greater and lesser rates together make the required total amount.

2. The apparatus according to claim 1 wherein each of the first and second support arms is tubular so as to provide a conduit for the irrigation water from the pipe to the respective one of the first and second nozzles.

3. The apparatus according to claim 1 wherein each of the first and second support arms is pivotal around a longitudinal axis of the pipe so as to adjust a height of the respective one of the first and second nozzles relative to the pipe.

4. The apparatus according to claim 3 wherein each of the first and second support arms is supported by a respective one of a pair of wires each of which extends from a position adjacent the pipe to provide support for the respective one of the first and second support arms in at least two adjustment positions of the height of the first and second nozzles.

5. The apparatus according to claim 3 wherein each of the first and second support arms is cantilevered from the pipe;
  wherein the first support arm is supported by a first linkage, where a length of the first linkage can be adjusted to provide raised and lowered positions of the height of the first nozzle;
  and wherein the second support arm is supported by a second linkage, where a length of the second linkage can be adjusted to provide the raised and lowered positions of the height of the second nozzle;
  and wherein the first and second linkages are operable to move both the first and second nozzles to the raised position simultaneously and to move both the first and second nozzles to the lowered position simultaneously.

6. The apparatus according to claim 5 wherein each of the pair of the linkages is manually actuated to flip between said raised and lowered positions.

7. The apparatus according to claim 6 wherein each of the first and second the linkages includes an over-center link which can be manually actuated to flip between said at least two adjustment positions.

8. The apparatus according to claim 1 wherein each of the first and second nozzles of each of the dispensing arrangements is adjustable to vary a rate of the irrigation water dispensed thereby and are adjusted such that the second nozzle dispenses onto the ground a rate of the irrigation water where the ratio of the rate of the first nozzle to the second nozzle lies in the range 60/40 up to 80/20.

9. Apparatus for irrigation comprising:

a pipe for carrying irrigation water and arranged to extend along an area to be irrigated;

a plurality of support carriages at spaced positions along a length of the pipe arranged to carry the pipe forwardly in a direction of travel transverse to its length;

a plurality of water spray dispensing arrangements at spaced along the length of the pipe so that each dispensing arrangement acts to deposit a water spray of the irrigation water on the ground in a spray pattern at a respective one of a plurality of spray positions along the length of the pipe;

each dispensing arrangement comprising;

a first nozzle and a second nozzle where the first and second nozzles are arranged one in advance of the other as the pipe moves in the direction of travel;

a first support arm attached to the pipe at one end of the first support arm and extending forwardly from the pipe so as to carry the first nozzle at an opposed end of the first support arm;

the first nozzle thus being carried by the first support arm in advance of the pipe;

a second support arm attached to the pipe at one end of the second support arm and extending rearwardly from the pipe so as to carry the second nozzle at an opposed end of the second support arm;

the second nozzle thus being carried by the second support arm rearwardly of the pipe;

so that the first nozzle dispenses the irrigation water onto the ground in advance of the pipe and in advance of the second nozzle as the pipe moves forwardly in the direction of travel;

wherein each of the first and second support arms is cantilevered from the pipe;

wherein the first support arm is pivotal around a longitudinal axis of the pipe so as to adjust a height of the first nozzle relative to the pipe between raised and lowered positions of the first nozzle;

wherein the second support arm is pivotal around a longitudinal axis of the pipe so as to adjust a height of the second nozzle relative to the pipe between raised and lowered positions of the second nozzle;

wherein the first support arm is supported by a first linkage, where a length of the first linkage can be adjusted to provide the raised and lowered positions of the height of the first nozzle;

and wherein the second support arm is supported by a second linkage, where a length of the second linkage can be adjusted to provide the raised and lowered positions of the height of the second nozzle;

and wherein the first and second linkages are operable to move both the first and second nozzles to the raised position simultaneously and to move both the first and second nozzles to the lowered position simultaneously.

10. The apparatus according to claim 9 wherein each of the first and second linkages is manually actuated to flip between said at least two adjustment positions.

11. The apparatus according to claim 10 wherein each of the first and second linkages includes an over-center link which can be manually actuated to flip between said raised and lowered positions.

12. The apparatus according to claim 10 wherein each of the first and second support arms is tubular so as to provide a conduit for the irrigation water from the pipe to the respective one of the first and second nozzles.

13. The apparatus according to claim 10 wherein each of the first and second support arms is supported by a respective one of a pair of wires each of which extends from a position adjacent the pipe to provide support for the respective one of the first and second support arms in said at least two adjustment positions of the height of the first and second nozzles.

* * * * *